United States Patent [19]
Tourtellotte et al.

[11] 3,739,583
[45] June 19, 1973

[54] CONTROL OF NITROGEN OXIDES EMISSION FROM ENGINES

[75] Inventors: John F. Tourtellotte, Westfield; John S. Negra, South Plainfield; Abe Warshaw, Matawan; John F. Villiers-Fisher, Kendall Park, all of N.J.

[73] Assignee: Chemical Construction Corporation, New York, N.Y.

[22] Filed: Feb. 25, 1972

[21] Appl. No.: 229,276

[52] U.S. Cl. .................................. 60/274, 60/278
[51] Int. Cl. ....... F02b 75/10, G01n 3/14, F01n 3/16
[58] Field of Search .................. 60/274, 278, 279; 123/119 A

[56] References Cited
UNITED STATES PATENTS

| 3,393,668 | 7/1968 | Milgram | 60/290 |
| 3,647,394 | 3/1972 | Wetch | 60/278 |
| 3,646,764 | 3/1972 | Nakajima | 123/119 A |

Primary Examiner—Douglas Hart
Attorney—J. L. Chaboty

[57] ABSTRACT

The emission of nitrogen oxides in engine exhaust gas is curtailed, by passing the engine exhaust gas through a catalyst bed for selective reduction of nitrogen oxides to nitrogen, and recycling a minor portion of the treated exhaust gas to the engine intake, so that the recycled exhaust gas is present during fuel combustion in the engine and nitrogen oxides formation is reduced.

14 Claims, 1 Drawing Figure

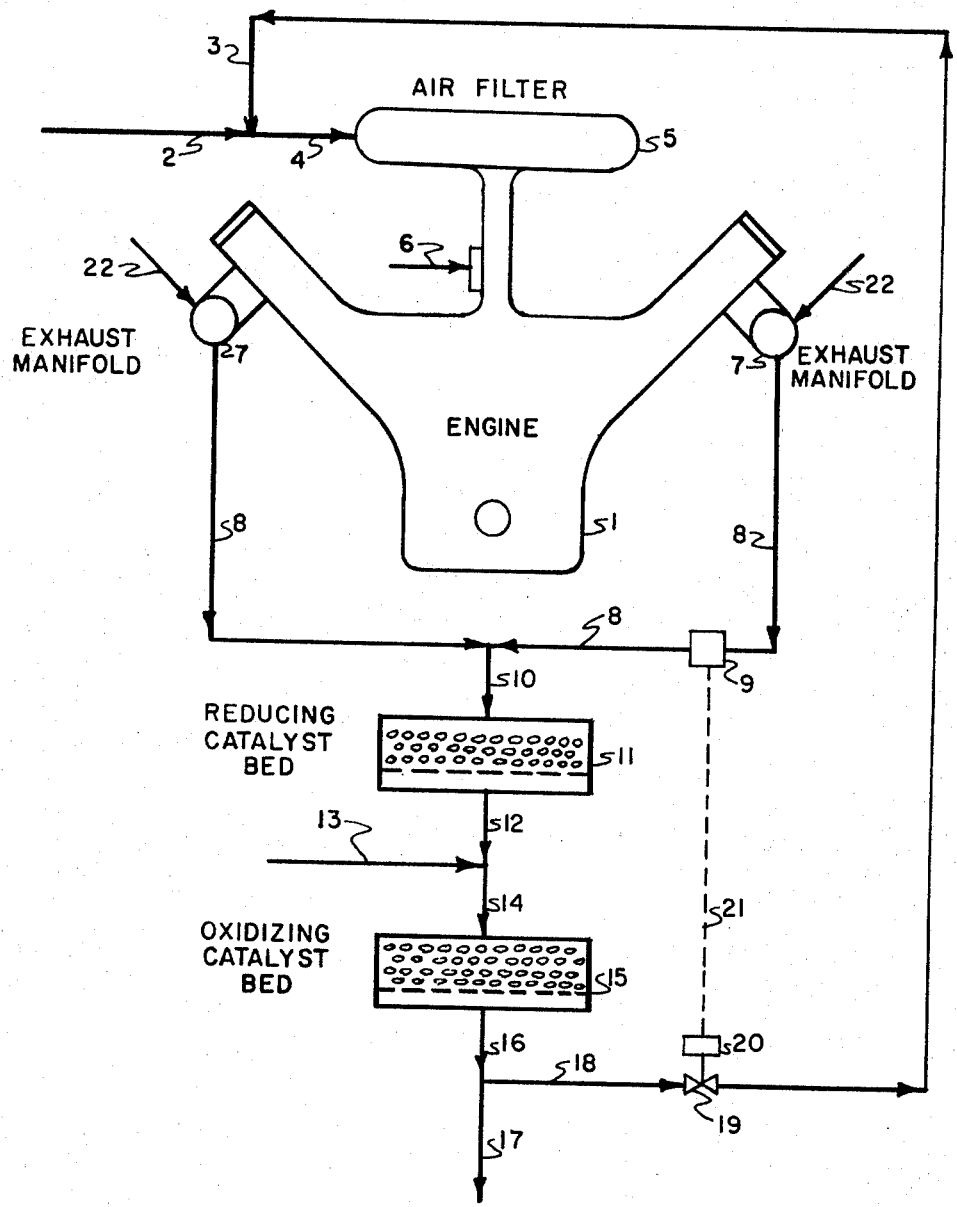

3,739,583

CONTROL OF NITROGEN OXIDES EMISSION FROM ENGINES

BACKGROUND OF THE INVENTION

Field of the Invention

The invention relates to the prevention of air pollution due to the emission of nitrogen oxides in the exhaust gas of engines, such as internal combustion engines as provided for automobiles, trucks, buses, tractors and motorcycles or the like. In recent years it has been recognized that the exhaust gas discharged from internal combustion engines is a serious source of air pollution, especially in metropolitan areas. In some areas a so-called smog is generated due to atmospheric inversions and accumulation of such exhaust gases in the atmosphere. Recent attempts to prevent such air pollution have concentrated on the destruction or elimination of noxious components by catalysis, especially by admixture of secondary air into the exhaust gas after initial catalytic reduction of nitrogen oxides, followed by catalytic oxidation of a residual hydrocarbons, carbon monoxide, etc., in various types of apparatus or catalytic mufflers specially designed for this purpose. The invention particularly relates to a system in which the exhaust gas is initially passed through a reducing catalyst bed to selectively reduce nitrogen oxides to nitrogen by catalytic reduction with carbon monoxide, hydrogen and/or hydrocarbons, which may be initially present in the exhaust gas.

The catalytic reduction-oxidation procedure, during steady state operation with a hot engine and hot exhaust gas, results in the elimination of most of these deleterious components initially present in the exhaust gas from external or internal combustion engines such as jet engines, gas turbines, diesel engines, and gasoline-burning automobile, bus and truck engines, so as to prevent the discharge into the atmosphere of these noxious components including unburned hydrocarbons, other organic vapors, carbon monoxide and nitrogen oxides, and thereby prevent air pollution.

Description of the Prior Art

Numerous catalytic devices and mufflers, and treatment systems have been proposed for the processing of exhaust gas emitted by engines, so as to control engine exhaust emissions and prevent the discharge of noxious components into the atmosphere. Among the many patents relating to catalysis and catalytic formulations may be mentioned U.S. Pat. Nos. 3,053,773; 3,429,656; 3,316,057; 3,398,101; 3,477,893 and 3,476,508 and U.S. Pat. application Nos. 55,998 filed July 17, 1970 and now allowed and No. 45,576 filed June 11, 1970. Apparatus for carrying out the procedure are described in U.S. Pat. Nos. 3,380,810; 3,325,256; 3,255,123; 3,222,140; 3,186,806; 3,180,712; 3,169,836; 3,168,806; 3,146,073 and 3,086,839 and U. S. Patent application Nos. 33,359 filed Apr. 30, 1970 and now U.S. Pat. No. 3,656,915, and No. 143,401 filed May 14, 1971, which describe two-stage apparatus for carrying out the process with interstage air injection.

SUMMARY OF THE INVENTION

In the present invention, nitrogen oxides content in the exhaust gas from an engine is reduced to very low levels and air pollution is prevented, by a synergistic combination of two procedural factors. The initial exhaust gas discharged from the engine is passed through a catalyst bed containing an active catalyst for the reduction of nitrogen oxides to nitrogen by reaction with carbon monoxide, hydrocarbons and/or hydrogen contained in the exhaust gas. Then, the treated exhaust gas may be subjected to further catalysis after air addition, to oxidize the oxidizable components such as carbon monoxide and hydrocarbons to innocuous products such as carbon dioxide and water vapor. In any case, a portion of treated exhaust gas consisting generally of 3 to 20 percent by volume of the treated exhaust gas is recycled to the intake appurtenances of the engine, such as the air filter or intake manifold, so that the recycled treated exhaust gas passes into the engine reaction chambers and is present during fuel combustion. The recycle of treated exhaust gas to the engine intake serves to effectively curtail the formation of nitrogen oxides during fuel combustion. Thus, a combination procedure and method is provided for effectively reducing nitrogen oxides formation during engine operation, and for eliminating the small portion of nitrogen oxides present in the initial exhaust gas discharged during engine operation.

The principal advantage of the present invention is that nitrogen oxides emission in the exhaust gas discharged from an engine is effectively curtailed and prevented, and thus air pollution from engine operation is prevented. Another advantage is that the system is simple and inexpensive, and may be readily installed in existing engines and vehicles, as well as in newly manufactured engines and vehicles. A further advantage is that the method utilizes treated exhaust gas as a viable component and therefore does not rely on extraneous materials or components for utilization.

It is an object of the present invention to provide an improved method for preventing air pollution due to discharge of nitrogen oxides in the exhaust gas of an engine.

Another object is to curtail the formation of nitrogen oxides during the operation of an engine.

A further object is to prevent the emission into the atmosphere of nitrogen oxides discharged from an engine.

An additional object is to reduce the concentration of nitrogen oxides in the exhaust gas discharge from an engine.

These and other objects and advantages of the present invention will become evident from the description which follows:

DESCRIPTION OF THE DRAWING AND PREFERRED EMBODIMENTS

Referring now to the drawing, a flowsheet of the method of the invention is presented.

The engine 1 is any suitable internal or external combustion engine, which may be stationary or mounted on a moving vehicle such as an automobile, truck or bus. Various other types of engines to which the present invention is applicable are mentioned supra. In this embodiment of the invention, engine 1 is a gasoline-burning internal combustion engine mounted on an automobile chassis, and engine 1 is operating under normal load and temperature conditions. Primary combustion air stream 2 is combined with recycled treated engine exhaust gas stream 3, and the combined gas stream 4 is drawn into air filter 5. The combined gas stream 4, which consists mostly of air, and generally consists of a mixture containing about 80 to 95 percent air by volume, balance exhaust gas, flows downwards from filter 5 and mixes with fuel stream 6, which may be any suitable fluid hydrocarbon such as gasoline or the like. The resulting combustion mixture flows into the engine intake manifold, not shown, and thereafter into the engine cylinders. Combustion of the fuel stream 6 in the engine cylinders generates usable power. Due to the addition of stream 3 to stream 2, so that exhaust gas stream 3 is present during combustion, the formation of nitrogen oxides during combustion is effectively and substantially curtailed. The combustion of the fuel in the engine cylinders generates an initial exhaust gas containing noxious components including a small proportion of nitrogen oxides, as well as unburned and thermally degraded hydrocarbons, and carbon monoxide.

The initial exhaust gas is collected in the exhaust manifolds 7, and as will appear infra a small proportion of secondary air may be injected into the manifolds 7 to attain initial oxidation of a portion of the carbon monoxide and hydrocarbons in the exhaust gas. In any case, the exhaust gas is discharged from manifolds 7 via streams 8. A portion of streams 8 passes through temperature sensor 9, which is typically a pneumatic device, a bimetallic thermostat, or a thermocouple or the like for measuring the stream 8 gas temperature, which during normal operations of the engine 1 is generally above about 200° C and typically in the range of 350° C to 900° C.

Streams 8 are combined to form stream 10 which flows into a bed or a plurality of beds of reducing catalyst within container 11. The reducing catalyst in unit 11 is a suitable reducing catalyst for the reduction of nitrogen oxides to innocuous nitrogen by reaction with hydrocarbon vapors, carbon monoxide and/or hydrogen contained in stream 10. Typical catalysts or catalyst formulations for attaining this reduction reaction are nickel, cobalt, manganese or copper, or mixtures thereof, deposited on a suitable carrier such as alumina, kaolin, silica, etc. The active metallic constituents may be present in the catalyst formulation in the metallic state, as oxides or reduced oxides, or as salts. Other suitable or conventional catalysts, such as those specified in the patents and patent applications enumerated supra, may also be employed in unit 11.

The resulting exhaust gas stream 12 discharged from container 11 is now depleted in nitrogen oxides content, and in most instances stream 12 will be substantially devoid of nitrogen oxides. However, stream 12 usually contains residual hydrocarbon vapors and carbon monoxide. Secondary air stream 13 is added to stream 12, in order to provide excess oxygen in the resultant combined stream 14, which now passes into container 15 which contains a bed or a plurality of beds of an oxidation catalyst for the catalytic oxidation of a major portion or substantially all of the hydrocarbon vapors and carbon monoxide in the gas stream to innocuous products such as water vapor and carbon dioxide. The catalyst bed in unit 15 typically consists of oxides or reduced oxides or salts of nickel, cobalt, manganese or copper, or mixtures thereof, or elemental metals derived from reduced oxides, deposited on a suitable carrier such as alumina, kaolin, silica or the like. Other suitable catalyst formulations may be employed in unit 15, such as those described in the patents and patent applications enumerated supra. An exothermic catalytic reaction takes place in the bed within unit 15 between free oxygen and residual hydrocarbon vapor and/or carbon monoxide, whereby these noxious components derived from the exhaust gas are oxidized to innocuous reaction products.

The resultant treated exhaust gas stream 16 discharged from unit 15 is now divided into stream 17, which is discharged to atmosphere without causing air pollution, and stream 18 which is recycled to the engine 1 intake in accordance with the present invention. Stream 18 is generally about 3 to 20 percent of stream 16, and for optimum results in most instances stream 18 will be about 7 to 13 percent of stream 16. Stream 18 flows through flow control valve 19 and passes via stream 3 to the engine intake appurtenances as described supra and in accordance with the present invention.

The control valve 19 is adjusted by valve setting regulator 20, which receives a signal or setting via the mechanical, electrical or pneumatic line 21 which extends to temperature sensor 9 described supra. In most instances, unit 9 will transmit a signal via line 21 during engine startup and warmup to close valve 19, especially when the temperature of stream 8 and catalyst bed unit 11 is below about 350° C. In addition, unit 9 will also usually be set to transmit a signal via line 21 to close valve 19 during periods of engine overload or overheating or the like, when the temperature of stream 8 rises to about 900° C or higher. During normal operation of the engine 1, stream 8 will generally be at a temperature above about 200° C and typically in the range of about 350° C to 900° C and unit 9 will transmit a signal via line 21 to valve regulator 20 to maintain valve 19 either partially or fully open, and the adjustment of valve 19 may be made directly or inversely proportional to temperature level of stream 8 in suitable instances.

Returning to exhaust manifolds 7, a small but effective proportion of air may be injected into manifolds 7 via streams 22, in order to provide an in situ oxidation of a portion of the oxidizable components within manifold 7 and unit 11. The proportion of air injected via streams 22 will generally be less than or up to about 30 percent in excess of the stoichiometric requirement to oxidize the carbon monoxide contained in stream 8, which permits a redox reaction to take place in unit 11, with simultaneous reduction of nitrogen oxides and oxidation of hydrocarbons and carbon monoxide. In some instances however, stream 22 may be omitted.

Numerous alternatives within the scope of the present invention will occur to those skilled in the art. Stream 3 may be admitted into the carburetor or intake manifold or together with stream 6, or at any suitable point or sections of the intake system and appurtenances of the engine 1. The valve control system generally shown as units 9, 21 and 20 may be replaced by suitable functionally equivalent devices or equipment in suitable instances. Thus, the operation of valve 19 may be alternatively controlled by time cycle relays or the like, so that valve 19 is only opened after the first 2 to 8 minutes after startup of a cold engine, or during the first 1 to 5 minutes after startup when ambient temperatures are relatively high. Then, after this initial time period, typically 2 minutes in duration, the valve 19 would be opened by a time control relay initially activated by the starter circuit or the like. The temperature ranges and limitations enumerated supra will vary, depending on the type of engine, the nature of the fuel, and the nature or type of catalyst employed in units 11 and/or 15. In some instances such as described in allowed U. S. Pat. application No. 33,359 filed Apr. 30, 1970 and also in application No. 143,401 filed May 14, 1971, the reducing and oxidizing catalyst beds will be integrally combined into a single device such as a catalytic muffler and the same catalytic agent, known as a redox catalyst because of ability to catalyze both reducing and oxidizing reactions, may be employed in both catalyst beds. The temperature sensing element 9 may alternatively measure exhaust gas temperature within beds 11 or 15 or the temperature of stream 12. In any alternative of this nature, the operating parameter of exhaust gas temperature is measured so as to control the setting of valve 19. Finally, stream 18 may be derived as a portion of stream 12 in some instances, such as when unit 15 is omitted.

An example of the application of the method of the present invention to an automobile engine will now be described.

EXAMPLE

The present system was applied to a 350 cu. in. Oldsmobile 1971 model engine. The internal combustion engine tested has the following parameters:

| | |
|---|---|
| Displacement | 350 cu. in. |
| Compression Ratio | 8.1/1 |
| Air Fuel Ratio at 30 mph | 14.0 |
| Ignition Timing at 1100 rpm | 10° BTC |
| Fuel | Indolene |
| Engine Type | V8 |
| Automatic Transmission | Spark Control |

The following data was obtained on the above engine fitted to an dynamometer. Inertia load was 4,500 lbs. with 12.7 road load horsepower.

| Stream No. | flow CFM* | Temp. °C | Eng. Speed Mph | Concentration in Vol. % | | |
|---|---|---|---|---|---|---|
| | | | | HC as Hexane | CO | NOx |
| 3 | 0 | | idle | | | |
| 10 | 20 | 420 | idle | 0.10 | 1.5 | 0.15 |
| 3 | 1.5 | 90 | idle | 0.003 | 0.0 | 0.005 |
| 10 | 20 | 420 | idle | 0.107 | 2.0 | 0.085 |
| 13 | 6 | ambient | 30 | | | |
| 14 | 38 | | 30 | | | |
| 16 | 38 | 650 | 30 | 0.003 | 0.0 | 0.005 |
| 3 | 3.2 | 95 | 30 | 0.003 | 0.0 | 0.005 |

* at 20°C, 1 atm.

We claim:

1. A method for reducing nitrogen oxides concentration in the exhaust gas from an engine which comprises passing the exhaust gas from an engine through a catalyst bed for the selective reduction of nitrogen oxides to nitrogen, whereby a portion of the nitrogen oxides originally present in the exhaust gas discharged from said engine is catalytically reduced to nitrogen, and recycling in the range of about 3 to 20 percent of the treated exhaust gas to the intake of said engine, whereby treated exhaust gas passes into said engine and is present during combustion of fuel in said engine and thereby reduces nitrogen oxides formation in said engine.

2. The method of claim 1, in which said engine is an internal combustion engine.

3. The method of claim 2, in which said internal combustion engine is mounted on a vehicle selected from the group consisting of an automobile, a truck, a bus, a tractor and a motorcycle.

4. The method of claim 1, in which the temperature of said catalyst bed is at least 350° C during recycle of treated exhaust gas to said engine, and the initial temperature of the exhaust gas discharged from said engine is below 900° C.

5. The method of claim 1, in which in the range of about 7 to 13 percent of the treated exhaust gas is recycled to said engine.

6. The method of claim 1, in which a small but effective proportion of air is added to the exhaust gas discharged from said engine, prior to passing the exhaust gas through said catalyst bed, whereby a portion of the oxidizable components in said exhaust gas are oxidized.

7. The method of claim 1, in which said catalyst bed contains an active catalytic agent selected from the group consisting of copper, cobalt, nickel and manganese, and mixtures thereof, deposited on a carrier.

8. A method of reducing nitrogen oxides concentration in the exhaust gas from an engine which comprises passing the exhaust gas from an engine through a first catalyst bed for the selective reduction of nitrogen oxides to nitrogen, whereby a portion of the nitrogen oxides originally present in the exhaust gas discharged from said engine is catalytically reduced to nitrogen, adding air to the exhaust gas discharged from said first catalyst bed, passing the resulting air-exhaust gas mixture through a second catalyst bed for the selective oxidation of oxidizable components in said exhaust gas, dividing the treated exhaust gas discharged from said second catalyst bed into a major portion and a minor portion, said minor portion being in the range of about 3 to 20 percent of the total treated exhaust gas, discharging said major portion of treated exhaust gas and recycling said minor portion of treated exhaust gas to the intake of said engine, whereby treated exhaust gas passes into said engine and is present during combustion of fuel in said engine and thereby reduces nitrogen oxides formation in said engine.

9. The method of claim 8, in which said engine is an internal combustion engine.

10. The method of claim 9, in which said internal combustion engine is mounted on a vehicle selected from the group consisting of an automobile, a truck, a bus, a tractor and a motorcycle.

11. The method of claim 8, in which the temperature of said first catalyst bed is at least about 200° C during recycle of treated exhaust gas to said engine.

12. The method of claim 8, in which said minor portion of treated exhaust gas is in the range of about 7 to 13 percent of the total treated exhaust gas.

13. The method of claim 8, in which a small but effective proportion of air is added to the exhaust gas discharged from said engine, prior to passing the exhaust gas through said first catalyst bed, whereby a portion of the oxidizable components in said exhaust gas are oxidized.

14. The method of claim 8, in which said first and second catalyst beds contain an active catalytic agent selected from the group consisting of copper, cobalt, nickel and manganese, and mixtures thereof, deposited on a carrier.

* * * * *